United States Patent
Wnenchak et al.

[11] Patent Number: 6,110,243
[45] Date of Patent: Aug. 29, 2000

[54] CLEANABLE FILTER BAG ASSEMBLY

[75] Inventors: Raymond M. Wnenchak; John E. Bacino, both of Newark; Stephen K. Stark; Erik H. Wildt, both of Wilmington; Karen Tronto, Hockessin, all of Del.

[73] Assignee: Gore Enterprise Holdings, Inc., Newark, Del.

[21] Appl. No.: 09/169,530

[22] Filed: Oct. 9, 1998

Related U.S. Application Data

[63] Continuation-in-part of application No. 08/749,582, Nov. 15, 1996, Pat. No. 5,928,414, which is a continuation-in-part of application No. 08/680,770, Jul. 11, 1996, abandoned.

[51] Int. Cl.[7] .................................................. B01D 29/21
[52] U.S. Cl. ................... 55/379; 55/381; 55/521; 55/528
[58] Field of Search ............... 95/278–281; 55/302–304, 55/378–381, 493, 521, 528

[56] References Cited

U.S. PATENT DOCUMENTS

| | | | |
|---|---|---|---|
| 2,933,154 | 4/1960 | Lauterbach | 55/528 X |
| 3,953,566 | 4/1976 | Gore | 264/288 |
| 3,957,938 | 5/1976 | Gravley | 55/528 X |
| 4,025,679 | 5/1977 | Denny | 55/528 X |
| 4,096,227 | 6/1978 | Gore | 264/210 R |
| 4,187,390 | 2/1980 | Gore | 55/528 X |
| 4,324,574 | 4/1982 | Fagan | 55/528 X |
| 4,830,643 | 5/1989 | Sassa et al. | 55/528 X |
| 4,861,353 | 8/1989 | Wyss | 55/96 |
| 4,877,433 | 10/1989 | Oshitari | 55/528 X |
| 4,878,930 | 11/1989 | Manniso et al. | 55/493 |
| 4,902,423 | 2/1990 | Bacino | 210/500.36 |
| 4,983,434 | 1/1991 | Sassa | 428/36.2 |
| 4,985,296 | 1/1991 | Mortimer, Jr. | 428/220 |
| 5,074,896 | 12/1991 | Baert et al. | 55/341.6 |
| 5,096,473 | 3/1992 | Sassa et al. | 55/302 X |
| 5,207,812 | 5/1993 | Tronto et al. | 55/528 X |
| 5,324,579 | 6/1994 | Sassa et al. | 55/528 X |
| 5,368,734 | 11/1994 | Wnenchak | 55/528 X |
| 5,395,429 | 3/1995 | Sutsko et al. | 95/273 |
| 5,414,915 | 5/1995 | Pryne | 55/381 X |
| 5,476,589 | 12/1995 | Bacino | 210/500.36 |
| 5,478,372 | 12/1995 | Stark | 55/528 X |
| 5,527,569 | 6/1996 | Hobson et al. | 55/528 X |
| 5,928,414 | 7/1999 | Wnenxhak et al. | 95/280 |

FOREIGN PATENT DOCUMENTS

| | | | |
|---|---|---|---|
| 3-012209 | 1/1991 | Japan | 95/279 |
| WO90/08801 | 8/1990 | WIPO . | |
| WO95/05555 | 2/1995 | WIPO . | |

*Primary Examiner*—Robert H. Spitzer
*Attorney, Agent, or Firm*—Carol A. Lewis White

[57] ABSTRACT

The present invention is directed to novel filter bag assemblies comprising a support structure, such as a support cage of metal, plastic, or the like, and a filter media of expanded PTFE membrane(s) without a backing material or layer. In a preferred embodiment, the filter bag assembly further comprises a support cover, or cage cover, which fits over the exterior surface of the support, or cage, to prevent contact of the filter media with the cage.

14 Claims, 5 Drawing Sheets

CLEANABLE FILTER BAG ASSEMBLY

CROSS-REFERENCE TO RELATED APPLICATIONS

The present application is a continuation-in-part of U.S. patent application Ser. No. 08/749,582, filed Nov. 15, 1996, now U.S. Pat. No. 5,928,414, which is a continuation-in-part of U.S. patent application Ser. No. 08/680,770, filed Jul. 11, 1996, now abandoned.

FIELD OF THE INVENTION

The present invention relates to a novel cleanable filter bag assembly incorporating a filter media of expanded polytetrafluoroethylene membrane(s) alone without the requirement for a backing material.

BACKGROUND OF THE INVENTION

The removal of particulates from a gas stream has long been a practice in a variety of industrial fields. Conventional means for filtering particulates and the like from gas streams include, but are not limited to, filter bags, filter tubes and filter cartridges. For convenience herein, the term "filter element" will be used to refer collectively to these types of filtration means.

Conventional filtration techniques utilize the filter element to stop particles through the depth of the element, and as the particles build up in and/or on the element, the filtration efficiency of the element is increased. After an amount of dust has caked on the surface of the filter element, the flow rate of gas through the element is reduced to a level where the bulk dust cake must be removed from the element, typically by some form of agitation, such as vibration or the like.

Filter elements are typically constructed from felts and/or fabrics made from a variety of materials, including polyesters, polypropylenes, aramids, glasses and fluoropolymers. Selection of the type of material used is typically based on the gas stream with which the filter element comes in contact, the operating conditions of the system and the type of particulate being filtered.

It is common in the industrial filtration field to characterize the type of filter element, such as the filter bag, by the method of cleaning. The most common types of cleaning techniques are reverse air, shaker and pulse jet. Reverse air and shaker techniques are considered low energy techniques.

The reverse air technique is a gentle backwash of air on a filter bag which collects dust on the interior. The back wash collapses the bag and fractures the dust cake which exits the bottom of the bag to a hopper.

Shaker mechanisms clean the filter cake that collects on the inside of a bag as well. The top of the bag is attached to an oscillating arm which creates a sinusoidal wave in the bag to dislodge the dust cake.

Pulse jet cleaning techniques employ a short pulse of compressed air that enters the interior top portion of the filter tube. As the pulse cleaning air passes through the tube venturi, it aspirates secondary air and the resulting air mass violently expands the bag and casts off the collected dust cake. The bag will typically snap right back to the support cage and go right back into service collecting particles.

Of the three cleaning techniques, the pulse jet is the most stressful on the filter media. However, in recent years industrial process engineers have increasingly selected pulse jet baghouses for dust collection applications because of: (1) smaller unit size (sometimes as much as ½ to ¼ of the size of shakers and reverse air due to (a) higher volumetric airflow/cloth area ratios, and (b) on-line cleaning allows the unit to be designed at the design flow rate without the need for additional filter media area for off-line cleaning; (2) minimal number of moving parts; and (3) lower number of bags to replace when failed.

Referring to FIG. 8, a typical pulse jet cleaning sequence is shown. Inside hopper 120, the particulate laden gas stream (not shown) enters the hopper at inlet 122 and passes through filter bag 123. Tube sheet 125 inside hopper 120 prevents the gas stream from bypassing the filter bag. The filter bag 123 is kept open by support cage 126. The gas stream, after passing through the bag and out bag exit 129, exits the clean air compartment at outlet 127. In operation, particulate forms a dust cake 128 on the outside of the filter bag, as shown in the bag on the left of the figure. On cleaning to remove the filter cake, air from pulse pipe 130 enters the bag. This pulse of air 132 expands the bag, loosening the dust cake and thus causing particulate 131 to collect at the bottom of the hopper 120. As seen in the bag on the right of the figure, the pulse jet causes the filter bag to expand.

Polytetrafluoroethylene (PTFE) has demonstrated utility in many areas. As an industrial material, such as a filtration material, for example, PTFE has exhibited excellent utility in harsh chemical environments, which normally degrade many conventional metals and polymeric materials. PTFE is also usable over a broad temperature range, from as high as 260° C. to as low as near −273° C.

However, conventional non-porous PTFE materials possess insufficient porosity to be effective as filtration means, particularly in the case of unexpanded PTFE in sheet form. Alternative means have been developed, such as the formation of woven felts or mats of unexpanded PTFE fibers, whereby particles are trapped between the fibers in the weave. Limitations still exist in these materials, however, due at least in part to the non-porous nature of the PTFE.

A significant development in the area of particle filtration was achieved when expanded PTFE membrane was incorporated as a surface laminate on conventional filter elements. One example is taught in U.S. Pat. No. 4,878,930, directed to a filter cartridge for removing particles of dust from a stream of moving gas or air. Preferred filter media for the cartridge are felt or fabric composites containing a layer of porous expanded polytetrafluoroethylene membrane.

Use of expanded PTFE membrane greatly enhanced the performance of filter elements because the particles collected on the surface of the expanded PTFE, rather than in the depth of the elements as was occurring in the absence of the expanded PTFE layer. Several significant advantages were observed with these filter elements. First, the filtration efficiency of the elements was high immediately from the outset of the filtration process, and it was not necessary to "build up" a cake of particles to achieve high efficiency. Second, the elements lasted longer because particles were not getting into the backing fabric of the element and rubbing on the fibers to wear them out. Third, the cleaning energy needed to clean the particle cakes off of the elements was lower because the surface of the membrane was smooth and had a lower surface energy.

A filter bag made completely of expanded PTFE is described in U.S. Pat. No. 4,983,434, which shows an expanded PTFE membrane laminated to a felt of carded expanded PTFE staple fiber. This filter bag provides good pulse jet cleaning capabilities due to the strength and flexibility of the expanded PTFE, while also providing good heat resistance, chemical inertness and high air permeability.

In each of the cases described above incorporating expanded PTFE, the filter element comprises a membrane laminated to a backing material which purportedly provides support to the membrane to permit it to withstand the rigors of the filtration and cleaning processing. Conventional teachings in the field of filtration focused on the need for heavier support, or backing, materials to provide more durability to the filter element; however, the use of heavier support materials for higher strength and durability led to a trade-off with blocking more airflow through the filter and requiring more energy to clean the filter element.

For example, laminates weighing up to 22 ounces/square yard (745 g/square meter) were developed which provided longer life, but were heavy, bulky and required more energy to flex or clean the elements. Further drawbacks to such materials included, but were not limited to, high manufacturing costs due to the complex nature of the laminated elements, wear of the bags due to internal stresses between the laminated layers, the need for precision fitting of the elements in the filter assemblies in order to prevent movement of the filter element against the support, resulting in wear, and eventually failure, of the bag, difficulty in achieving effective cleaning, contamination due to particulation of the laminated media, larger quantities of material to dispose of after the filter bags wore out, and the need to accommodate the excess bulk of the laminated filter elements within the design of the filtration assemblies.

U.S. Pat. No. 5,074,896, issued Dec. 24, 1991, in the names of Baert et al., teaches a gas filtration device in a frame of a multiplicity of elongated porous PTFE membrane filter pouches supported within by individual frames and without by a cradle. Preferred filtration membranes are described as including porous PTFE, known under the designation of Gore-Tex®, and expanded PTFE membranes. However, in the filtration systems taught by Baert et al., the filtration media made only from expanded PTFE membrane without a backing layer would not have sufficient durability to withstand the installation and operating conditions. Particularly, the expanded PTFE would be highly susceptible to wear or tear on the interior frame or cage made from e.g., metal, during filtering. Thus, the system described by Baert et al. suffers from significant limitations in performance.

U.S. Pat. No. 4,861,353, to Wyss, issued Aug. 29, 1989, is directed to a filter element and assembly including a tubular textile of filamentary PTFE useful to prolong the mechanical life of a filter material. The tubular element has a gas permeability of at least 1000 ft$^3$ per ft$^2$ per minute measured at a pressure of ½ inch of water. The tubular textile is placed over a filter cage and a filter bag is placed over the tubular textile to (1) prevent direct contact between the filter bag and the metal, and (2) lower the extent to which the filter is pressed into the interstices of the cage. However, the tubular textile taught by Wyss is limited to assemblies incorporating filter bags which are relatively inflexible. Particularly, conventional filter bags comprising a microporous membrane laminated to a backing material, are particularly suited for use with the tubular textile, as the flexing of the filter bag during the filtering operation results in no, or only minimal, contact with the exposed cage; however, the open weave of the tubular textile of filamentary PTFE taught by Wyss leaves exposed surfaces of the filter cage which could contact and damage filter bags incorporating flexible media. Thus, significant restrictions exist with respect to the filter bags which may be incorporated with the filtration assemblies taught by Wyss.

The novel filter elements of the present invention are designed to solve these problems and provide significant advantages over the filter elements of the prior art, as described in more detail herein.

SUMMARY OF THE INVENTION

The present invention is directed to novel filter bag assemblies incorporating a filtration media of one or more expanded polytetrafluoroethylene (ePTFE) membrane(s) without the requirement for a backing material. These novel filter elements are based on an unconventional and unexpected approach to solving filtration problems in the filter element industry. Particularly, the discovery that using a filter media of ePTFE membrane(s) alone, which typically has less overall strength than prior art laminated structures, as the filter media in a filter bag assembly results in superior performance in cleanable filter elements over existing filters made from ePTFE laminated structures and has far-reaching benefits in the field of filtration.

The superior performance of ePTFE membrane alone as the filter media allows extreme flexibility in the use and design of filter assemblies and filtration systems. Specifically, because the filter media is made from thin membrane(s) of ePTFE, which is particularly light weight and flexible, air flow through the filter element is very high relative to conventional laminated materials and, accordingly, very low energies are required to dislodge the collected cake from its surface. The ability to use such low amounts of energy to clean the filter element puts very little stress on the membrane, thus resulting in surprising durability and much longer life of the media than would be expected based on the performance of conventional materials. Moreover, the use of membrane of light weight ePTFE material minimizes repeated rubbing, and thus wear, of the material on the filter cages, as compared to conventional laminated materials, and eliminates the presence of induced stresses between laminated layers which exist in conventional laminated structures. In addition, the chemical and temperature resistance of the ePTFE membrane permits the use of the filter element over a wide range of temperatures and chemical environments. Further, the filter media of the present invention is non-linting and non-contaminating due to the media being only ePTFE membrane, thereby providing excellent filtration performance for a variety of industries requiring high efficiency filtration.

The novel filter bag assembly comprises a filter support, such as a support cage of metal, plastic, or the like, a filter media of one or more expanded PTFE membrane(s) without a backing material or layer, and a support cover, or cage cover, which fits over the exterior surface of the support cage between the cage and the filter bag to prevent contact of the filter media with the cage, thus reducing the potential for wear or damage to the filter media due to catching or rubbing of the media on the filter cage. Particularly, not only does the contact of the media with smooth surfaces of the cage cause wear on the media, but also the cage typically can have any number of surface irregularities, such as burrs, rust, molding or machining roughness, which can damage the media upon contact. The filter media is able to move freely during cleaning, such as back pulsing of the system, to dislodge the collected cake from its surface, while the cage cover remains adjacent the support cage and protects the media from wear against the filter.

Suitable cage covers may be selected from woven, knitted, nonwoven or other porous, air permeable materials and may be of polyester, aramid, polytetrafluoroethylene, or other materials which are compatible with the given air filtration application. Suitable cage covers have a gas permeability of 550 Frazier or below to provide sufficient coverage of the cage to prevent contact between the membrane and the cage. More preferably, the cage covers have a gas permeability of 200 Frazier or below, and more preferably, 125 or below, and even more preferably of 60 or below, and the permeability can even be as low as 3 Frazier or below. The criterion for determining sufficient permeability of the cage cover is based on the air flow requirements of a given system, and thus may vary significantly. Thus, a high surface coverage of the cage while maintaining adequate permeability through the cage cover provides the best performance of the present filter assembly.

A further added benefit of the present invention is the use of only a small quantity of material in the filter media component of the filter bag assembly, thus minimizing the quantity of material to be disposed in a worn filter element. Particularly, the filter bag of expanded PTFE membrane may be separated from the filter cage and cage cover when the filter bag becomes worn, and the cage and cage cover may be re-used with a new filter bag.

DESCRIPTION OF THE DRAWINGS

The foregoing summary, as well as the following detailed description of the invention, will be better understood when read in conjunction with the appended drawings. For purposes of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
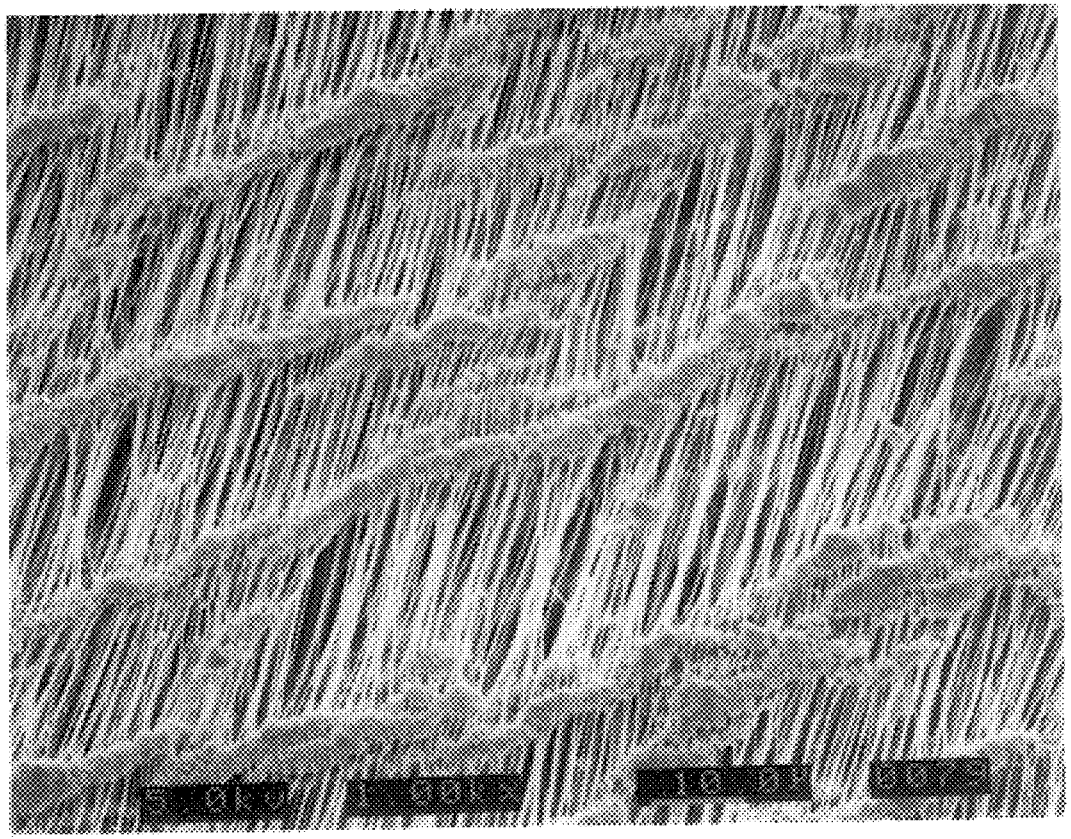
FIG. 1 is a photomicrograph of an ePTFE membrane at 1000×magnification.

The present invention is directed to an improved cleanable filter bag assembly incorporating a filter media of expanded polytetrafluoroethylene (ePTFE) membrane.

The filter media of the novel filter bag assembly possesses strength which is sufficient to withstand filtration processing, such as, but not limited to, pulse jet filtration, without the requirement for a backing material or the like. Thus, a feature of the present invention is the superior performance of ePTFE membrane alone as a cleanable filtration media for use in the novel filter bag assemblies of the present invention, as compared to conventional filter elements.

Further, the filter bag assemblies of the present invention may be fabricated with universal dimensions which could be adapted to suit a wide variety of filtration system assemblies, thus obviating the need for a large number of filter bag configurations tailored to fit the large variety of filter assemblies which currently exist. For example, as mentioned earlier herein, conventional laminated structure filtration media require a very tight fit to the support cage not only to prevent movement, and corresponding wear, of the filter element against the cage, but also to prevent stresses between layers during flexing and cleaning. In this regard, it is believed that the use of a highly flexible, conformable ePTFE filter media which is fitted easily onto a support structure such as a cage in such a manner as to allow the element to hang or rest loosely on the structure may facilitate cleaning of the element, provide additional surface area for filtration and reduce the potential for dust collecting in crevices of the support structure.

The ability to use low energies to clean the filter element puts very little stress on the membrane, thus resulting in surprising durability and longer life of the element than would be expected based on the performance of conventional materials. Suitable cleaning methods of the present invention include, but are not limited to, vibration, back pulsing, reverse air cleaning, sonic cleaning and shaking. Moreover, the ability to use lower energies for cleaning of the filter assemblies may permit filtration system designers significant flexibility in designing more effective, lower energy filtration systems.

A further added benefit of the present invention is the use of a small overall volume of filter media in the filter elements of the present invention as compared to laminated structures, thus reducing the quantity of material to be discarded in a worn filter. The novel ePTFE filter elements of the present invention typically occupy only 10% of the volume of conventional laminated filter element materials and weigh on average 80% less than such conventional materials. For example, an average ePTFE media of the present invention typically weighs about 30–40 g/square meter, as compared to about 400 g/square meter for a conventional lightweight polyester laminate filter media. Moreover, corresponding savings in shipping and handling may also be realized for the present materials.

The filtration media of ePTFE membrane used to fabricate the filter elements of the present invention exhibits high air flow coupled with high ball burst strength. A preferred ePTFE filter element material of the present invention is made in the following manner. A fine powder PTFE resin is blended with a lubricant, such as odorless mineral spirits, until a compound is formed. The volume of lubricant used should be sufficient to lubricate primary particles of the PTFE resin so as to minimize the potential of the shearing of the particles prior to extruding.

The compound is then compressed into a billet and extruded, such as through a ram type extruder, to form a coherent sheet of extrudate. A reduction ratio of about 30:1 to 300:1 may be used (i.e., reduction ratio=cross-sectional area of extrusion cylinder divided by the cross-sectional area of the extrusion die). For most applications a reduction ratio of 75:1 to 100:1 is preferred.

The lubricant may then be removed, such as through volatilization, and the dry coherent extrudate sheet is expanded rapidly in at least one direction about 1.1 to 50 times its original length (with about 1.5 to 2.5 times being preferred). Expansion may be accomplished, such as through the method taught in U.S. Pat. No. 3,953,566, by passing the dry coherent extrudate over a series of rotating heated rollers or heated plates at a temperature of between about 100 and 325° C. Alternatively, the extruded sheet may be expanded in the manner described in U.S. Pat. No. 4,902,423, to Bacino, prior to removal of the lubricant. In a further alternative embodiment, the extruded sheet may be expanded in the manner taught in U.S. Pat. No. 5,476,589, to Bacino. The subject matter of each of these patents is specifically incorporated herein by reference.

In a preferred embodiment, the material may be further expanded at a ratio of 1:1.1 to 50:1, with 5:1 to 35:1 being preferred, to form a final microporous sheet. Preferably the sheet is biaxially expanded so as to increase its strength in both its longitudinal and transverse directions. Finally, the material may be subjected to an amorphous locking step by exposing it to a temperature in excess of 340° C.

The material of the present invention is preferably made in the form of sheets, which, due to their inherent flexibility, may be formed into a wide variety of other shapes as desired, such as tubes, strips, convex or concave structures, etc. Additionally, to address particular applications, the material of the present invention may likewise be extruded or otherwise formed into continuous tubes, rods (i.e., cylinders), rectangles, uneven shapes and other structures that may be of interest.

Sheets made from the above processing steps can be produced in thicknesses ranging from, but not limited to, 0.01 mm to 2 mm. Sheets may also be subsequently layered upon themselves and subjected to temperatures ranging from about 300° C. to 400° C. while applying sufficient pressures to bond the layers together.

Referring to FIG. 1, a micrograph of the ePTFE membrane of the present invention is depicted in cross-section at a magnification of 1000×. As is clearly shown in FIG. 1, the ePTFE membrane of the present invention has a microstructure characterized by elongated nodes interconnected by fibrils arranged in sheaths of parallel stria. These sheaths of parallel stria are arranged generally in the direction of longitudinal expansion. The fibrils appear coarse in nature, and the elongated nodes are arranged substantially perpendicular to the direction of longitudinal expansion. The porosity of the material may be 1 Frazier or higher, and the Ball Burst Strength of the material may range from 3 to 50 pounds, preferably 12 to 18 pounds.

The ePTFE membrane may be filled with various fillers presently used to fill expanded microporous PTFE, as is taught in U.S. Pat. No. 4,096,227 to Gore and U.S. Pat. No. 4,985,296 to Mortimer, Jr., incorporated herein by reference. Suitable particulate fillers may include, for example, inorganic materials such as metals, semi-metals, metal oxides, glass, ceramics, and the like. Alternatively, other suitable particulate fillers may include, for example, organic materials selected from activated carbon, carbon black, polymeric resin, and the like. Moreover, if conductive filler is used to fill the ePTFE membranes and is present in a sufficient amount, the ePTFE may exhibit static dissipative or conductive properties, and ePTFE filter elements produced from such ePTFE membranes may be static dissipative or conductive in nature as well.

The term "static dissipative" as used herein is intended to include any material with a volume resistivity of less than $10^9$ and greater than $10^2$ ohm cm as determined by ASTM D 257-90. The term "conductive" as used herein is intended to include any material having a volume resistivity of $10^2$ ohm cm or less as determined by ASTM D 257-90. "Particulate" is defined herein to mean individual particles of any aspect ratio including powders, fibers, etc.

Figure 2A:
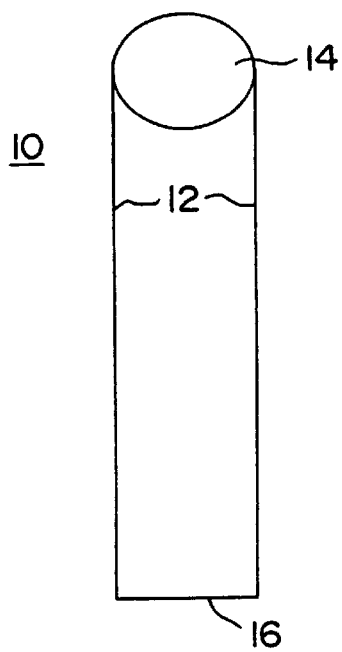
FIGS. 2A and 2B are embodiments of filter bags formed in accordance with the present invention.
Figure 2B:
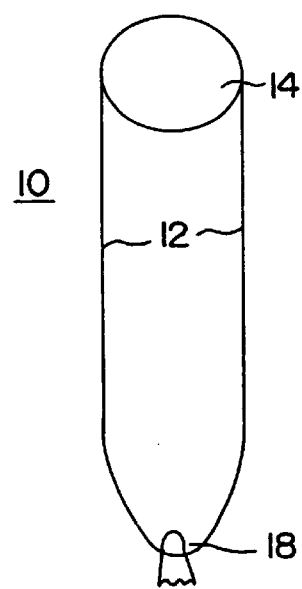

The filter elements of the present invention may be fabricated using any number of conventional ePTFE shaping and/or bonding techniques. In a preferred embodiment of the present invention, the filter element can be fabricated by welding sheets of ePTFE membrane along an edge or seam, with no requirement for stitching or sealing as required with conventional laminated filter elements. For example, as shown in FIG. 2A, a filter element 10 may be fabricated by stacking two sheets of ePTFE membrane one on top of the other, and the edges 12 and bottom 16 may be sealed by welding, leaving an opening 14 to permit placement of the filter element 10 onto a support cage. Further, in another embodiment, as shown in FIG. 2B, the filter element 10 may be fabricated in the shape of a tube by welding the side seams 12 and leaving both ends open, whereby one end 14 is affixed to the support cage and the other end 18 is closed off by tying the membrane in a knot.

Support structures which may optionally be used in the filter elements of the present invention can vary widely depending on a number of conditions, including the configuration of the filter element, the type of material to be filtered, the filtration system into which the filter element will be incorporated, and the like. For example, suitable support structures for use in the present application include cages which may be fabricated from materials such as metals, plastics, and natural fibers, including woven or nonwoven forms, such as spunbonded polyester, nonwoven aramid felt materials, metal or plastic meshes, or the like.

Figure 3A:
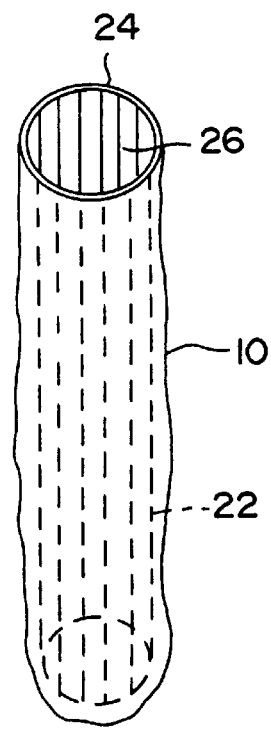
FIGS. 3A and 3B show a filter bag assembly incorporating a filter bag prior to and during filtration, respectively, in accordance with the present invention.
Figure 3B:
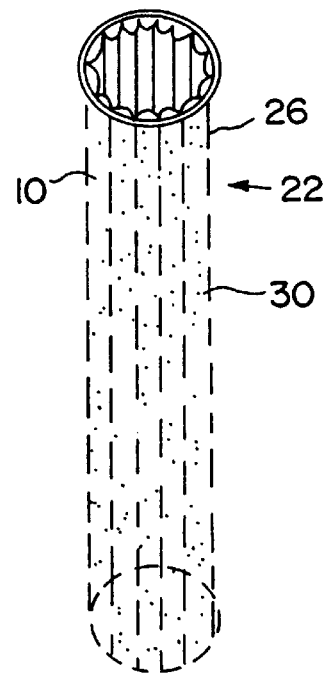
Figure 4:
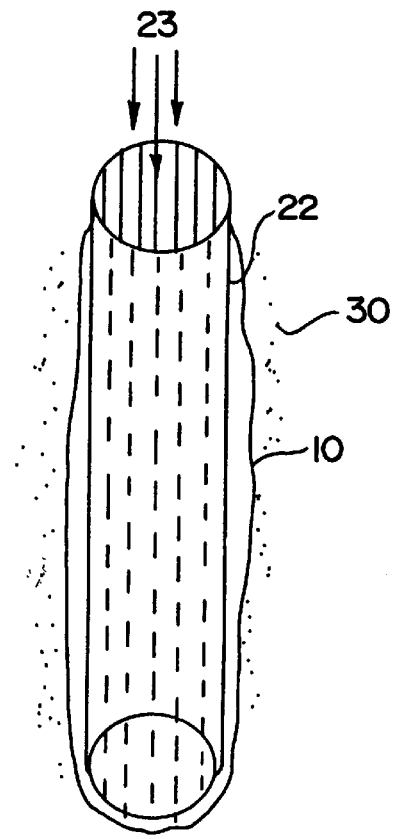
FIG. 4 is the filter bag assembly of FIGS. 3A and 3B showing the filter bag upon flexing or cleaning during operation of the assembly.

FIG. 3A shows a filter bag 10 of the present invention attached to a support cage 22 having support ribs 26 by an attachment means, such as attachment ring 24. FIG. 3B shows the filter bag 10 of FIG. 3A as it appears during a typical filtration operation. As a vacuum or other means is created to move gas through the filter bag 10 to filter out particulate 30, the filter bag 10 is pulled or pushed inward between the support ribs 26 of the support cage 22. FIG. 4 shows the filter bag 10 of FIGS. 3A and 3B during a pulse cleaning operation. Specifically, during cleaning, gas is moved through the filter bag 10 in a direction indicated by arrows 23 which is opposite the flow of gas maintained during filtration, and the filter bag 10 is blown away from the support cage 22, thus inducing the particulate 30 to fall off of the filter bag 10.

While the present figures demonstrate specific embodiments of filtration elements and assemblies, it is contemplated that any comparable filtration technique, such as providing air flow in directions opposite to those embodiments shown, would be encompassed by the present invention.

Figure 5A:
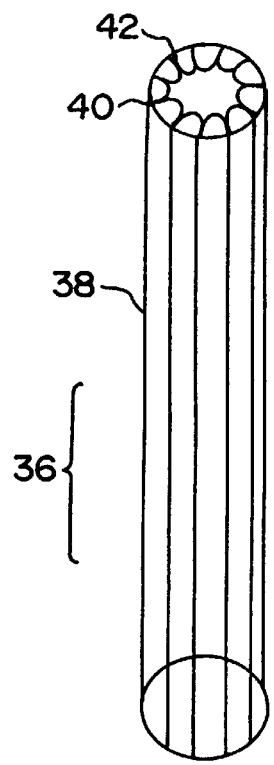
FIGS. 5A and 5B show a filter cartridge of the present invention during filtration and cleaning, respectively.
Figure 5B:
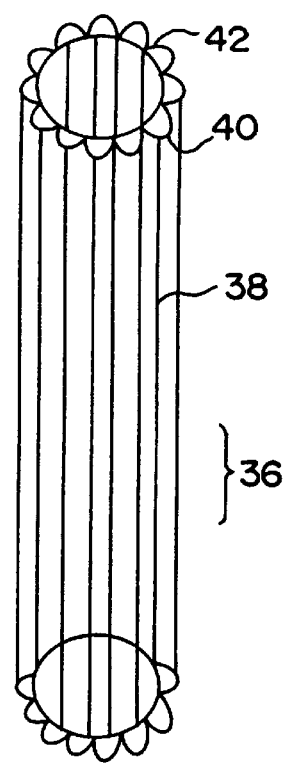
Figure 5C:
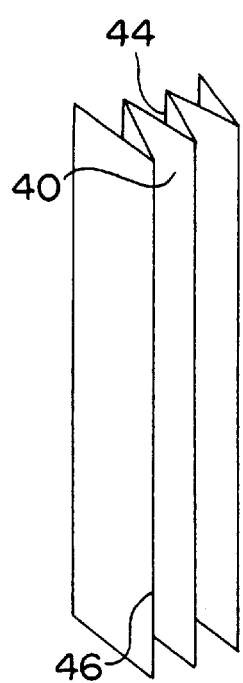
FIGS. 5C and 5D show a perspective view of a portion of a filter cartridge of the present invention during filtration and cleaning, respectively.
Figure 5D:
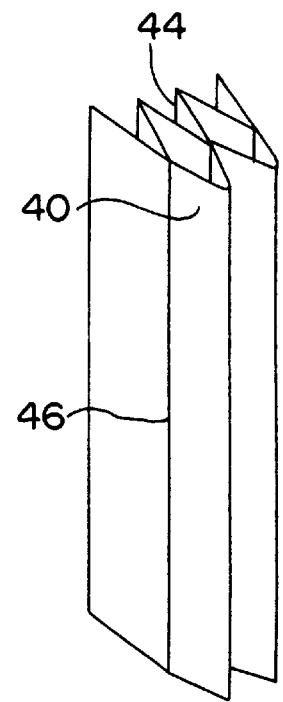

Alternative geometries which may be desirable for the filter elements of the present invention include incorporating the media into a filter cartridge. FIGS. 5A and 5B show a filter cartridge of the present invention, wherein a support cage 36 with vertical members 38 is provided and the media 40 is pleated between the vertical members. The media 40 is affixed, such as by use of an adhesive, by welding, or by any other suitable means, to the vertical members 38, creating the pleat tips 42. Particularly preferred vertical members comprise a material that would readily allow adhesion of the media, although other materials may be used with alternative adhesion means. In this embodiment, the pleats are extremely flexible, thus allowing complete inversion of the pleat during filtration, as shown in FIG. 5A, and during cleaning, as shown in FIG. 5B. Thus, the pleats move from a concave orientation during filtering to a convex orientation during cleaning, or vice versa depending on the construction of the filter assembly. FIGS. 5C and 5D show a perspective view of a portion of a filter cartridge, comprising a pleated support member 44 during filtering and cleaning, respectively, wherein the media 40 is attached to the pleat tips 46 of the pleated support member 44. As with FIGS. 5A and 5B, upon filtering and cleaning the media 40 moves from a concave position during filtering to a convex position during cleaning, or vice versa depending on the filter assembly construction. The ability to create such convex and concave pleats provides added surface area during filtering, thus enhancing filtration performance of a filter, and complete cleaning of the pleat depth during cleaning.

Preferred means for adhering the filter media to the support structure include, but are not limited to, adhering by the use of a suitable adhesive, welding or fusing the media to the structure, and attaching a rod, wire, thread or other mechanical retainer which secures the media to the structure similar to the method described in U.S. Pat. No. 4,878,930, discussed earlier herein. Suitable adhesives may include hot melt polyimides, RTV silicones, epoxies, polyurethanes, and the like.

In an alternative preferred embodiment of a filter cartridge assembly of the present invention, the filter media may be held in place against a support structure or attached directly to a support structure comprising, for example, a pleated woven or nonwoven material, such as a spunbonded polyester or nonwoven felt material, metal or plastic mesh, or the like. In this embodiment, the filter media may be attached to the support structure in any number of configurations, depending on the desired performance of the filter.

In a first alternative configuration of this embodiment of the present invention, the filter media may be held against the support structure by providing any one of cages, frames, straps, belts, or any other external means which holds the filter element in contact with at least a portion of the support structure. The external means may comprise metal, plastic, fabric, or any other material which is compatible with the filtration operation, and may be attached to the assembly with or without an adhesive material.

Figure 6A:
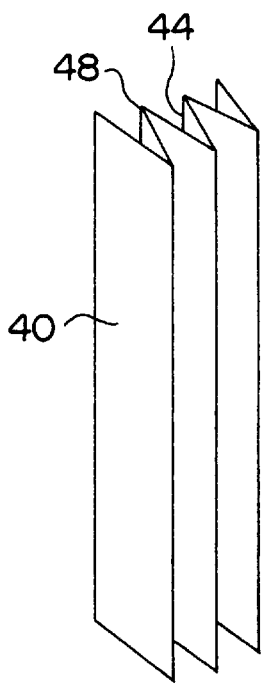
FIGS. 6A and 6B show a further embodiment of a filter cartridge of the present invention during filtration and cleaning, respectively.
Figure 6B:
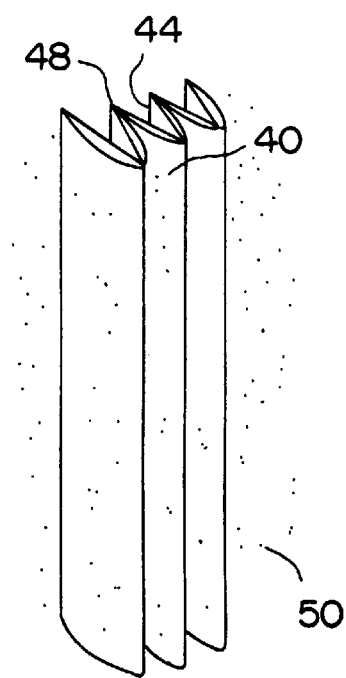

In a second alternative configuration of this embodiment, the filter media may be attached to the outer or inner folds of the pleated support structure through the use of an adhesive, by fusing, or the like. Similar to the configuration mentioned above with respect to FIGS. 5A and 5B, the attachment of the filter media to the outer folds of the support structure permits complete inversion of the pleats during filtration and cleaning. Alternatively, the filter media may be attached to the inner folds of the support structure. FIG. 6A shows a filter cartridge of the present invention comprising a pleated support structure 44 having a filtration media 40 attached to the inner folds 48 of the pleated structure 44. FIG. 6B is a representative view of the structure on cleaning, whereby the filtration media 40 is flexed away from the surface of the pleated structure 44 to induce the filtrate 50 to separate from the filtration media 40. In this configuration, while the filter media is held in closer contact with the support structure than when attached to the outer folds, the unattached portions of the media are free to pulse away from the surface of the support structure during cleaning, while avoiding wrinkling or folding during the filtering and cleaning operations.

In a third alternative configuration of this embodiment, the filter media may be affixed to a portion of the surface of the support structure by discontinuously bonding the media to the surface of the support structure. For example, the discontinuous bond may be in the form of vertical or horizontal lines, a gravure printed pattern, or any other configuration whereby the media is attached to the support structure by fusing or adhering the media to the support structure. Filter cartridges fabricated in this manner provide enhanced filtration due to the ability to flex or pulse the unattached portions of the membrane away from the surface of the support structure during cleaning, while maintaining the overall positioning of the filter media on the support structure without folding or bunching of the membrane during the filtration and cleaning operations.

Figure 7:
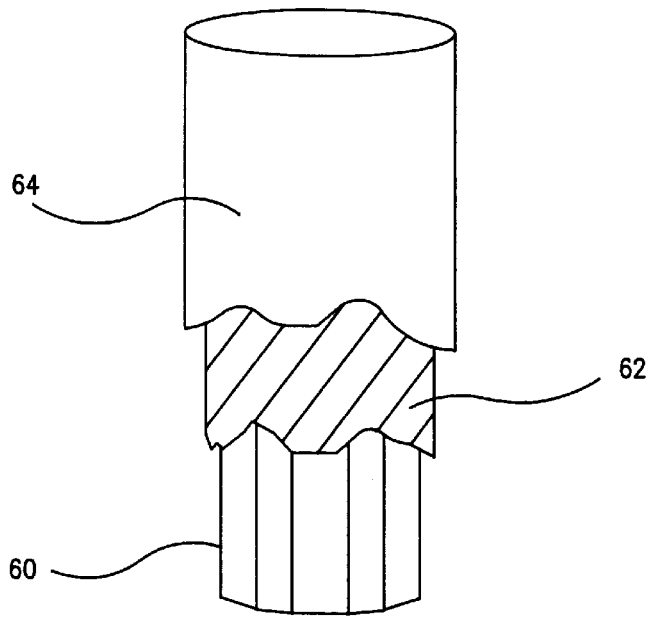
FIG. 7 shows a cut away view of a filter bag assembly of the present invention, showing a filter support covered with a support cover and a bag of expanded PTFE membrane filter media.
Figure 8:
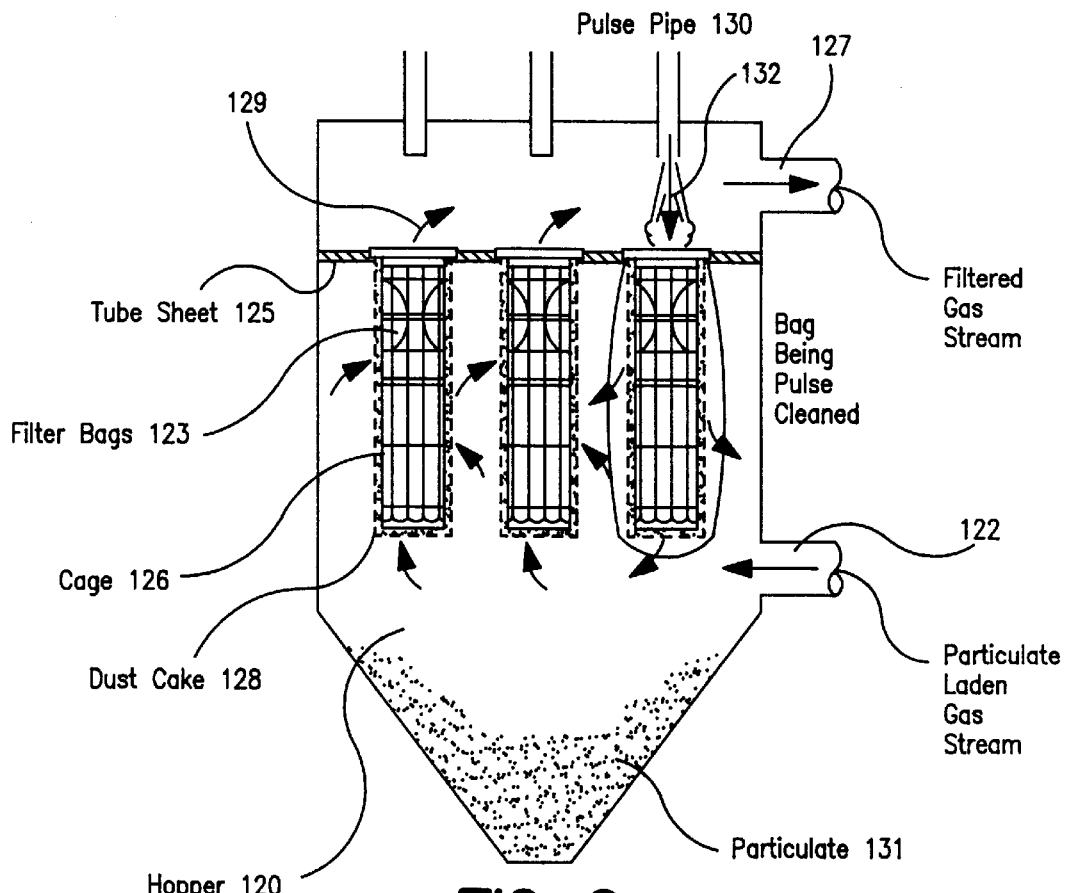
FIG. 8 is a schematic picture of a filter baghouse operation.

In another embodiment of the present invention, directed to a novel filter bag assembly, the assembly comprises a support cage 60, a cage cover 62 surrounding the support cage 60 and the filtration media 64 surrounding the cage cover 62, as depicted in cut-away view in FIG. 7. In this embodiment, the cage cover 62 is placed over the exterior of the support cage 60 to prevent contact of the filter media 64 with the cage 60, thus reducing wear and damage to the media which might otherwise occur due to catching or rubbing of the media on the support cage. As mentioned earlier, the cage cover may comprise polyester, aramid, polytetrafluoroethylene, or other suitable material in a porous form, whether woven, knitted, nonwoven, or otherwise, and has a gas permeability of 550 Frazier or below to provide sufficient coverage of the cage to prevent contact between the membrane and the cage. More preferably, the cage covers have a gas permeability of 200 Frazier or below, and more preferably 125 or below, and even more preferably of 60 or below, and the permeability can even be as low as 3 Frazier or below, provided it has sufficient permeability to still meet the requirements of the filtration system.

In a further embodiment of the present invention, in certain industries where even small defects or holes in a filter bag may result in particularly detrimental contamination, it may be desirable to provide multiple layers of filter media in the filter element (for example, "double bagging" in the case of a filter bag assembly) to ensure that failure of a filter element does not occur.

TEST METHODS

Ball Burst Strength

This test measures the relative strength of a sample of media by determining the maximum load at break. The media is challenged with a 1 inch (2.54 cm) diameter ball while being clamped between two plates. The Chantillon, Force Gauge/Ball Burst Test was used.

The media is placed taut in the measuring device and pressure affixed by raising the web into contact with the ball of the burst probe. Pressure at break is recorded.

Air Permeability—Frazier Number Determination

Air permeability of materials are determined according to test methods entitled ASTM D 737-75, "Standard Test Method for AIR PERMEABILITY OF TEXTILE FABRICS." Specifically, air permeability was measured by clamping a test sample in a gasketed flanged fixture which provided a circular area of approximately 6 square inches (3871 square mm) (2.75 inches (70 mm) diameter) for air flow measurement. The upstream side of the sample fixture was connected to a flow meter in line with a source of dry compressed air. The downstream side of the sample fixture was opened to the atmosphere.

Testing was accomplished by applying a pressure of 0.5 inches water gauge to the upstream side of the sample and recording the flow rate of the air passing through the in-line flowmeter (a ball-float rotameter).

Results are reported in terms of Frazier Number which is air flow in cubic feet/minute/square foot of sample at 0.5 inches water gauge.

Differential Scanning Calorimetry

Thermal analysis of a sample is determined through the use of a Differential Scanning Calorimeter. Approximately 10 mg of sample is placed into the Differential Scanning Calorimeter and the temperature of the sample is increased from room temperature (approximately 21° C.) at a scan rate of 10° C./min.

The following examples are presented to further explain the teachings of the instant invention and are not intended to limit the scope of the present invention. Various modifications and equivalents will readily suggest themselves to those of ordinary skill in the art without departing from the spirit and scope of the present invention.

EXAMPLE 1

A filter bag of the present invention was produced in the manner described below.

A fine powder PTFE resin was combined with a quantity of an odorless mineral spirit and mixed until a paste was formed. The paste was compressed under a vacuum to form a billet, and the billet was subsequently extruded through a die, thereby forming a coherent PTFE extrudate.

The coherent PTFE extrudate was compressed between a pair of rollers until a coherent PTFE sheet measuring 0.51 mm thick was obtained. The coherent PTFE sheet still contained an amount of the odorless mineral spirit.

The odorless mineral spirit was volatilized from the coherent PTFE sheet yielding a dry, coherent PTFE sheet by passing the PTFE sheet over a series of rollers heated above the boiling point of the odorless mineral spirit but below the melting point of the PTFE resin.

The dry coherent PTFE sheet was subsequently expanded longitudinally in two passes over a series of three curved heated plates. In the first pass, each of the plates was heated to a temperature of 300° C., and the dry coherent PTFE sheet was passed onto the first plate at a rate of 7.62 m/min. On the first plate, the dry coherent PTFE sheet was expanded at a ratio of 2:1. On the second plate, the dry coherent PTFE sheet was expanded at a ratio of 8:1, and on the third plate the sheet was allowed to contract by 60% in length.

In the second pass, the dry coherent PTFE sheet was fed onto the first plate at a rate of 7.62 m/min., and the PTFE sheet was expanded on the first plate at a ratio of 3:1 while the plate was heated to a temperature of 300° C. On the second plate, the sheet was expanded at a ratio of 2:1 while the plate was heated to a temperature of 335° C. On the final plate, the sheet was expanded at a ratio of 1.11:1 while the plate was heated to a temperature of 360° C., a temperature above the crystalline melting point of the PTFE resin. The result was a substantially amorphously locked longitudinally expanded PTFE membrane.

The membrane was subsequently expanded in the transverse direction at a ratio of 2:1 at a set point temperature of about 365° C. The result was a porous membrane measuring 40 cm wide with a 50 Frazier number and a Ball Burst strength of 4.15 pounds.

The membrane was then cut into two sheets measuring 2.4 m (8 feet) in length and 17.2 cm (6.78 inches) wide. The sheets were laid one on top of the other and placed in a Vertrod Wire Welder Model 72E WB-HOV. The welder was brought down on one 2.4 m (8 foot) long edge of the stacked membranes to create a pressure of 80 psi at a temperature of about 350° C. for one second. The welder was maintained in place on the membranes until the welder cooled down to about 150° C., and then it was removed. The other 2.4 m (8 foot) edge of the stacked membrane was then sealed in the same manner. One end of the tube was then sealed in the same manner. The other end was left open so a support cage could be inserted into the formed filter bag. For installation of the filter bag, the open end was adapted to be press fit into a tube sheet hole.

EXAMPLE 2

A filter bag of the present invention was produced in the manner described below.

A dry coherent PTFE extrudate was produced as in Example 1. The dry coherent PTFE sheet was subsequently expanded in two passes over a series of three curved heated plates. The first pass was performed as described in Example 1.

In the second pass, the dry coherent PTFE sheet was fed onto the first plate at a rate of 10.67 m/minute and expanded at a ratio of 2:1 while the first plate was heated to a temperature of 300° C. On the second plate, the sheet was expanded at a rate of 2:1 while the plate was heated to a temperature of 335° C. On the final plate, the sheet was expanded at a rate of 1.11:1 while the plate was heated to a temperature of 360° C., a temperature above the crystalline melting point of the PTFE resin. The result was a substantially amorphously locked longitudinally expanded PTFE membrane.

The membrane was subsequently expanded in the transverse direction at a ratio of 2:1 at a set point temperature of about 365° C. The result was a porous membrane measuring 40 cm wide with a 30 Frazier number and a Ball Burst strength of 5.18 pounds.

The resulting membrane was then formed into a filter bag in the same manner as described in Example 1.

EXAMPLE 3

A membrane was formed substantially in accordance with Example 1.

The membrane was then bonded to a 20 wire round cage measuring 76 cm (30 inches) high in the following manner. The vertical wires of the cage were coated with a thermoplastic tubing. The membrane was then welded to each of the wires with excess material pleated in about 2.54 cm (1 inch) between the wires of the cage. Excess material at the bottom of the cage was gathered and taped, thus sealing the bottom. The excess material at the top of the cage was gathered, taped and sealed in a similar manner. In this configuration, the filter element took the form of a pleated cartridge in which the pleats were free to completely invert during the cleaning cycle.

EXAMPLE 4

A pleated filter cartridge of the present invention was produced in the following manner: A 40 cm wide web of membrane formed substantially in accordance with Example 1, was unrolled on top of a 40 cm wide web of Axtar spunbonded polyester (270 grams/sq. m), available from Toray Industries. The two layers were pleated together into a pleat pack consisting of 35 pleats at a pleat depth of about 25.4 mm. The pleat pack was compressed together as it was placed, with the membrane facing down, on a hot plate with a surface temperature of about 260° C. The pleat tips were pushed down on the hot plate for about 15 seconds, then removed and allowed to cool. In this process the polyester fibers at the pleat tips melted and formed a strong bond with the PTFE membrane along the edge of each pleat.

This pleat pack design was then formed into a filter cartridge by bonding the end pleats of spunbonded polyester together with polyamide hot melt adhesive, to form a cylindrical pleat pack. The loose membrane from the last pleat was sealed over the seam using a bead of RTV silicone (General Electric RTV 118). The 40 cm long cylindrical pleat pack was then placed around a 40 cm long center core made from perforated galvanized steel. The assembly was then potted into galvanized steel end-caps with an outside diameter of 141 mm. The potting compound was a PVC plastisol available from Dennis Chemical Company (St. Louis, Miss.) which was hardened by setting the filter assembly onto a hot plate with a surface temperature of about 190° C. for about 20 minutes.

EXAMPLE 5

A pleated filter cartridge of the present invention was produced in the following manner: A pleated pack was produced with the membrane bonded to the back of the pleat by applying a 4 mm wide bead of RTV silicone adhesive/sealant (General Electric RTV 118), along the bottom of the spunbonded polyester pleats. The membrane was then attached after applying the silicone, by pushing the membrane web down into the back of each pleat with a thin plastic rod, contacting the silicone at the back of the pleat. The silicone was allowed to cure for 24 hours.

This pleat pack design was then formed into a filter cartridge by bonding the end pleats of spunbonded polyester together with polyamide hot melt adhesive, to form a cylindrical pleat pack. The loose membrane from the last pleat was sealed over the seam using a bead of RTV silicone (General Electric RTV 118). The 40 cm long cylindrical pleat pack was then placed around a 40 cm long center core made from perforated galvanized steel. The assembly was then potted into galvanized steel end-caps with an outside diameter of 141 mm. The potting compound was a PVC plastisol available from Dennis Chemical Company (St. Louis, Miss.) which was hardened by setting the filter assembly onto a hot plate with a surface temperature of about 190° C. for about 20 minutes.

EXAMPLE 6

A filter bag assembly of the present invention was formed in the manner described below.

A fine powder PTFE resin was combined with a quantity of an odorless mineral spirit and mixed until a paste was formed. The paste was compressed under a vacuum to form a billet, and the billet was subsequently extruded through a die, thereby forming a coherent PTFE extrudate.

The coherent PTFE extrudate measured 0.70 mm thick. The coherent PTFE sheet still contained an amount of the odorless mineral spirit.

The odorless mineral spirit was volatilized from the coherent PTFE sheet yielding a dry, coherent PTFE sheet by passing the PTFE sheet over a series of rollers heated above the boiling point of the odorless mineral spirit but below the melting point of the PTFE resin.

The dry coherent PTFE sheet was subsequently expanded longitudinally over a series of three curved heated plates. Each of the plates was heated to a temperature of 300° C. The dry coherent PTFE sheet was expanded at a ratio of 2:1 on the first plate and 6.5:1 on the second plate. On the third plate, the dry coherent PTFE sheet was expanded at a ratio of 1:1 and a take-up speed of 4.57 m/min.

The sheet was then passed over a roller heated to a temperature of 365° C. at a speed of 6 m/min. The result was a substantially amorphously locked longitudinally expanded PTFE membrane.

The membrane was subsequently expanded in the transverse direction at a ratio of 2:1 at a set point temperature of about 400° C. The result was a porous membrane measuring 55 cm wide with a Frazier number of 7 and a Ball Burst strength of 15 pounds.

The resulting membrane was then formed into a filter bag in the same manner as described in Example 1.

A mild steel support cage measuring 1.5 m (5 feet) long and 14.2 cm (5.6 inches) in diameter and having an open end and a closed end was obtained from Royal Wire (North Royalton, Ohio). A cage cover was formed by inverting a knitted polyester tubular material measuring approximately 1.7 m (5 feet, 5 inches) long and 14.6 cm (5.75 inches) in diameter and closed at one end (BEANE BAG™ Style No. T100 filter bag, air permeability of 60 cubic feet per minute per ft$^2$ at ½ inch water gauge (w. g.), Industrial Filter Fabrics, Hamilton, Ontario, Canada). The cage cover was placed onto the support cage so that the closed end of the cage cover covered the closed end of the support cage. The expanded PTFE filter bag was then placed over the cage cover so that the closed end of the bag covered the closed end of the cage cover. The ends of the cage cover and bag which extended to the open end of the support cage were folded over the top edge of the support cage, and an expanded PTFE/polyester felt cuff (W. L Gore and Associates, Inc, Elkton, Md.) and hose clamp (Flex Kleen, Itasca, Ill.) were applied to hold the media and cover to the support cage.

EXAMPLE 7

The procedure outlined in Example 6 is repeated, except that the cage cover material comprises a polyester material (Blue Knit P-1324-2, permeability of 550 cubic feet per minute per square foot, from Warshow & Sons, Inc.)

EXAMPLE 8

The procedure outlined in Example 6 is repeated, except that the cage cover material comprises a polyamide material (NOMEX® SL E-89 spunlaced polyamide, Style 527-P, permeability of 200 cubic feet per minute per square foot, from E. I. du Pont de Nemours, Wilmington, Del.).

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A cleanable filter bag assembly for filtering particulates from a gas stream comprising:

a support cage;

an air permeable cage cover covering the support cage, the cage cover having an air permeability of 550 cubic feet per minute per square foot or below, and a filter bag consisting essentially of at least one layer of expanded PTFE membrane, whereby said cage cover protects said filter bag from contact with said support cage during said filtering.

2. The cleanable filter bag assembly of claim 1, wherein said expanded PTFE membrane has a Ball Burst number of from 3 to 50 pounds and an air permeability of at least 1 cubic foot per minute per square foot.

3. The cleanable filter bag assembly of claim 1, wherein said filter bag includes two or more layers of expanded PTFE.

4. The cleanable filter bag assembly of claim 1, wherein said filter bag further comprises at least one filler material within said expanded PTFE membrane.

5. The cleanable filter bag assembly of claim 1, wherein said assembly further comprises an attachment means for attaching said filter bag and cage cover to said support cage.

6. The cleanable filter bag assembly of claim 1, wherein said cage cover comprises a material selected from the group consisting of polyester, aramid and polytetrafluoroethylene.

7. The cleanable filter bag assembly of claim 1, wherein said support cage comprises at least one material selected from the group consisting of metal and plastic.

8. The cleanable filter bag assembly of claim 1, wherein said air permeability is 200 cubic feet per minute per square foot or below.

9. The cleanable filter bag assembly of claim 1, wherein said air permeability is 125 cubic feet per minute per square foot or below.

10. The cleanable filter bag assembly of claim 1, wherein said air permeability is 60 cubic feet per minute per square foot or below.

11. A cleanable filter bag assembly for filtering particulates from a gas stream comprising:

a support cage;

an air permeable knitted polyester cage cover covering the support cage, said cage cover having an air permeability of 550 cubic feet per minute per square foot or below, a filter bag consisting essentially of at least one layer of expanded PTFE membrane, said membrane having a Ball Burst number of from 3 to 50 pounds and a gas permeability of at least 1 cubic foot per minute per square foot, and an attachment means comprising a filter cuff and hose clamp for attaching said filter bag and cage cover to said support cage, whereby said cage cover protects said filter bag from contact with said support cage during said filtering.

12. The cleanable filter bag assembly of claim 11, wherein said air permeability is 200 cubic feet per minute per square foot or below.

13. The cleanable filter bag assembly of claim 11, wherein said air permeability is 125 cubic feet per minute per square foot or below.

14. The cleanable filter bag assembly of claim 11, wherein said air permeability is 60 cubic feet per minute per square foot or below.

* * * * *